(12) United States Patent
Merrick et al.

(10) Patent No.: US 9,517,940 B2
(45) Date of Patent: Dec. 13, 2016

(54) METHOD FOR MAKING POROUS ACICULAR MULLITE BODIES

(75) Inventors: Douglas D. Merrick, Midland, MI (US); Kristina Platkowski, Leipzig (DE); Janet M. Goss, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 397 days.

(21) Appl. No.: 14/125,794

(22) PCT Filed: Jun. 21, 2012

(86) PCT No.: PCT/US2012/043495
§ 371 (c)(1),
(2), (4) Date: Dec. 12, 2013

(87) PCT Pub. No.: WO2013/006281
PCT Pub. Date: Jan. 10, 2013

(65) Prior Publication Data
US 2014/0127112 A1    May 8, 2014

Related U.S. Application Data

(60) Provisional application No. 61/504,739, filed on Jul. 6, 2011.

(51) Int. Cl.
*C01B 33/26* (2006.01)
*C04B 35/185* (2006.01)
(Continued)

(52) U.S. Cl.
CPC .............. *C01B 33/26* (2013.01); *C04B 35/185* (2013.01); *F27B 5/04* (2013.01); *F27D 7/06* (2013.01);
(Continued)

(58) Field of Classification Search
CPC .............. C01B 33/26; F27B 5/04; F27B 7/06; C04B 35/185; C04B 2235/3229; C04B 2235/602; C04B 2235/3201; C04B 2235/3224; C04B 2235/3227; C04B 2235/80; C04B 2235/6586; C04B 2235/3225; C04B 2235/3208; C04B 2235/788; C04B 2235/44; C04B 2235/786; C04B 2235/46; C04B 2235/3206; C04B 2235/327
(Continued)

(56) References Cited

U.S. PATENT DOCUMENTS

2006/0197265 A1* 9/2006 Saha .................... B01D 53/885
264/646

FOREIGN PATENT DOCUMENTS

| JP | 05-172464 | 7/1993 |
| JP | 06-005533 | 1/1994 |

(Continued)

OTHER PUBLICATIONS

Reed, J., Introduction to the Principles of Ceramic Processing, John Wiley and Sons, NY, 1988, Chapters 20-21, Parts 1 and 2, pp. 329-372 and 373-379.
(Continued)

*Primary Examiner* — Colleen Dunn
*Assistant Examiner* — Haytham Soliman
(74) *Attorney, Agent, or Firm* — Gary C. Cohn PLLC (57) ABSTRACT

Acicular mullite bodies are made in two-step firing process in which a green body is converted first to a fluorotopaz and then to acicular mullite. The bodies are contained within an enclosed region of the furnace. A flow of process gas is provided through the enclosed region during the fluorotopaz-forming step. The process gas is introduced into the enclosed region through multiple openings on at least one
(Continued)

side of the enclosed region, and withdrawn through multiple openings on another side of the enclosed region. During the acicular mullite-forming step, a flow of purge gas is maintained in the exterior portion of the furnace. This purge gas may be removed by flowing it into the enclosed region of the furnace and out of the furnace from the enclosed region without re-entering the exterior portion for the furnace.

8 Claims, 3 Drawing Sheets

(51) Int. Cl.
  *F27B 5/04* (2006.01)
  *F27D 7/06* (2006.01)
(52) U.S. Cl.
  CPC .......... *C04B 2235/3201* (2013.01); *C04B 2235/3206* (2013.01); *C04B 2235/327* (2013.01); *C04B 2235/3208* (2013.01); *C04B 2235/3224* (2013.01); *C04B 2235/3225* (2013.01); *C04B 2235/3227* (2013.01); *C04B 2235/3229* (2013.01); *C04B 2235/3409* (2013.01); *C04B 2235/445* (2013.01); *C04B 2235/46* (2013.01); *C04B 2235/602* (2013.01); *C04B 2235/6586* (2013.01); *C04B 2235/786* (2013.01); *C04B 2235/788* (2013.01); *C04B 2235/80* (2013.01)

(58) Field of Classification Search
  USPC ...................................................... 423/327.2
  See application file for complete search history.

(56) References Cited

FOREIGN PATENT DOCUMENTS

| | | |
|---|---|---|
| JP | 07-058030 | 3/1995 |
| JP | 2010-007128 | 1/2010 |
| WO | 9001471 | 2/1990 |
| WO | 9009360 A1 | 8/1990 |
| WO | WO9101952 A1 | 2/1991 |
| WO | 9211219 | 7/1992 |
| WO | 03082773 A1 | 10/2003 |
| WO | 2004096729 A2 | 11/2004 |
| WO | WO2009158294 A1 | 12/2009 |

OTHER PUBLICATIONS

Reed. J., New York State College of Ceramics, Alfred University, Alfred, New York, John Wiley & Sons, Introduction to the Principles of Ceramic Processing, Chapters 20 and 21.

\* cited by examiner

METHOD FOR MAKING POROUS ACICULAR MULLITE BODIES

This application claims priority from U.S. Provisional Patent Application No. 61/504,739, filed 6 Jul. 2011.

This invention relates to methods for making porous acicular mullite bodies.

Acicular mullite takes the form of high aspect ratio needles. Masses of these needles form high surface area, highly porous structures which are characterized by their excellent temperature resistance and mechanical strength. Porous acicular mullite bodies are used as particulate traps to filter soot from the exhaust emitted from power plants. The power plant may be mobile or stationary. An example of a mobile power plant is an internal combustion engine. Stationary power plants include electricity and/or steam generating units. The porous acicular mullite bodies are also useful as catalyst supports, such as supports for precious metals in automotive catalytic converters.

A convenient way of manufacturing porous acicular mullite bodies starts with a "green body" that contains a source of aluminum and silicon atoms. By heating in the presence of a fluorine source, a fluorotopaz compound having the (theoretical) empirical formula $Al_2(SiO_4)F_2$ can be formed. The fluorotopaz compound then can be thermally decomposed to form mullite, which has the (theoretical) empirical structure $3Al_2O_3.2SiO_2$. The mullite crystals formed this way take the form of a mass of interconnected needles. The needles usually have an average diameter of up to about 25 microns. The interconnected needles form a porous structure in which the pores constitute from 40 to 85% of the volume of the body.

One approach to making the porous acicular mullite body is described, for example, in WO 90/01471. Aluminum trifluoride, silicon dioxide and optionally alumina are formed into a green body, which is heated to 650 to 950° C. to form a fluorotopaz compound. At 1150-1700° C., the fluorotopaz can react with additional $SiO_2$ under an anhydrous $SiF_4$ atmosphere to eliminate fluorine and produce mullite needles. $SiF_4$ is produced as a by-product of each of these reactions. Reaction rates in the fluorotopaz-forming step are limited in this approach, because the aluminum trifluoride must decompose to provide fluorine for the reaction. In addition, aluminum trifluoride can be an expensive starting material.

Another synthetic approach is described in WO 99/11219, WO 03/82773 and WO 04/96729. This approach uses a gas, most typically $SiF_4$, as the fluorine source and an aluminosilicate clay, silica and/or alumina as the aluminum and silicon sources. As before, a two-stage reaction occurs. A green body is formed, placed in a furnace, and the furnace is charged with the desired amount of $SiF_4$. The green body is then heated at a constant rate, in the presence of the $SiF_4$. As the temperature exceeds about 650° C., fluorotopaz forms in an exothermic reaction, and continues to form while the furnace is in the range of 700° C. to about 950° C. The fluorotopaz reacts further in a second, endothermic reaction to form mullite needles. This second reaction is typically performed under an $SiF_4$ atmosphere, by continuing to heat furnace to a temperature of at least 1000° C. The partial pressure of the $SiF_4$ is usually lower in the second step than during the fluorotopaz-forming reaction.

Fluorotopaz can begin to decompose to form mullite at temperatures as low as about 800° C., depending on the partial pressure of $SiF_4$ and other process variables. Therefore, within a certain temperature range, it is possible to be forming and decomposing the fluorotopaz intermediate at the same time. It is beneficial to try to separate these reactions, in order to achieve a consistent product quality. One way to do this is to maintain the reaction temperature in the first step at about 800° C. or below, so that the rate of the decomposition reaction is small or zero.

A problem with doing this is the temperatures of the parts are difficult to control due to the exothermic nature of the fluorotopaz-forming reaction. In particular, the cores of the parts tend to become overheated, as the heat of reaction sometimes cannot be removed quickly. The result of this is that the needle structure is inconsistent throughout the part.

Another problem arises in production-scale processing of the bodies. Production scale processes manufacture multiple parts simultaneously in a single furnace. It has been found that the individual bodies may react at different rates, especially during the fluorotopaz-forming reaction. As the reaction cycle time is determined by that of the slowest-to-react part, it is desirable that the parts all react at very close to the same rate, in order to minimize cycle time and the associated costs and loss of productivity.

Yet another problem is that a mixed metal fluoride byproduct can form during the reaction. This byproduct typically contains from 10 to 20% by weight potassium, from 1 to 10% sodium, from 15 to 30% aluminum and up to 70% fluorine. This mixed metal fluoride is volatile under the conditions of the fluorotopaz decomposition reaction. If it migrates to a cool spot in the reactor, it can condense out of the vapor phase and foul the reactor walls and other internal surfaces. This presents a significant cleaning problem. In addition, the mixed metal fluoride is in equilibrium with the forming acicular mullite, so long at it is in the vapor phase. If the mixed metal fluoride condenses or is otherwise removed from the system, more material will volatilize from the parts. As this removes aluminum but not silicon from the system, the aluminum:silicon ratio in the parts is affected, which can lead to a change in product properties. Potassium, sodium and fluoride are also removed, again leading to a change in the chemistry of the final part, and part-to-part or batch-to-batch product inconsistencies.

It would be desirable, therefore, to provide production processes that permit for rapid and economical production of porous acicular mullite bodies that have a consistent needle structure.

In one aspect, this invention is a process for producing an acicular mullite body or bodies, comprising:

(a) heating at least one green body to a temperature of 650° C. to 800° C. in an enclosed region of a furnace, in the presence of a process gas containing a fluorine-containing compound flowing through the enclosed region of the furnace, such that a source of aluminum and a source of silicon in the green body react with the fluorine-containing compound to form fluorotopaz, and then (b) heating the body to a temperature above 800° C. such that the fluorotopaz decomposes to form a porous acicular mullite body, wherein, in step (a), the process gas is introduced into the enclosed region through multiple inlets distributed over at least one side of the enclosed region and the process gas is withdrawn from the enclosed region through multiple outlets distributed over at least one other side of the enclosed region.

It has been surprisingly been found that by flowing the process gases through an enclosed region of the furnace in this manner during the fluorotopaz-forming reaction (step (a)), reaction rates during step (a) can be equilibrated across multiple bodies within the enclosed region of the furnace. This allows multiple parts to complete the fluorotopaz-forming reaction at very close to the same time, which reduces the overall cycle time.

In certain embodiments, the rate of flow and/or composition of the flowing process gas is used as a mechanism by which high local temperatures produced by the exothermic fluorotopaz-forming reaction that occurs during step (a) of the process are avoided. These parameters can be selected to produce within the enclosed region a partial pressure of fluorine-containing compound that provides a beneficial rate of reaction, such that the temperatures of the bodies are maintained during step (a) within a predetermined temperature range.

Cycle time is of course shortest when the reaction rates are maximized. Therefore, in a production setting, it is desirable during step (a) to feed the fluorine-containing compound as rapidly as possible into the enclosed region, consistent with maintaining the desired reaction temperatures and producing good quality parts. It has been found that relatively short cycle times can be maintained, consistent with temperature and quality control, if the fluorine-containing compound is fed at relatively high rates early in the reaction, followed by a reduction in the feed rate as the reaction proceeds. The rate at which the fluorine-containing compound is fed can be decreased continuously or in one or more increments as the fluorotopaz-forming reaction of step (a) proceeds, as described more fully below. The rate of feeding the fluorine-containing compound can be decreased by reducing the flow rate of the process gas and/or by decreasing the concentration of the fluorine-containing compound in the process gas.

For a given set of reaction conditions, in particular part mass and geometry, number of parts and furnace geometry, it is possible to empirically establish a set of conditions during step (a), including an addition rate profile for the process gas and/or concentration of the fluorine-containing compound in the process gas. This can be done by monitoring the temperatures of some or all of the parts during step (a) under various conditions of process gas flow rates and/or concentrations of fluorine-containing compound in the process gas, at various stages of the fluorotopaz-forming reaction. By monitoring the temperatures in such a fashion, one can empirically establish a profile of flow rate(s) and process gas composition(s) allow the parts to be maintained within a predetermined range of temperatures during the course of the fluorotopaz-forming reaction. The profile can then be used each time those reaction conditions are reproduced, and it becomes unnecessary in such a case to continue to monitor part temperatures directly.

This invention is in yet another aspect a process for producing acicular mullite bodies, comprising:

(a) heating a green body to an elevated temperature in the presence of a fluorine-containing compound, such that a source of aluminum and a source of silicon in the green body react with fluorine to form fluorotopaz, and then (b) heating the body to a temperature such that the fluorotopaz decomposes to form a porous acicular mullite body, wherein steps (a) and (b) are conducted within an enclosed region within a furnace, such that during step (b), the interior walls of the enclosed region and the internal spaces within the enclosed region are maintained at a temperature of at least 1000° C., and further wherein, during step (b), a purge gas is flowed through the portion of the furnace exterior to the enclosed region.

In a preferred embodiment of this aspect of the invention, the purge gas is removed from the areas of the furnace exterior to the enclosed region by flowing it into and through of the enclosed region within the furnace, and then out of the furnace without re-entering the areas of the furnace exterior to the enclosed region.

The method of this last aspect significantly reduces reactor fouling due to mixed metal fluoride deposition.

Methods for making a porous acicular mullite body as described in WO 92/11219, WO 03//082773 and WO 04/096729 are generally applicable here. In general, a green body is formed, in substantially the shape and dimensions required of the final part. The green body is composed of at least in part of a source of aluminum and a source of silicon. The green body is caused to react with a fluorine-containing compound to form fluorotopaz, which is then thermally decomposed with loss of $SiF_4$ to form mullite needles.

Suitable aluminum and silicon sources include materials such as described in WO 92/11219, WO 03//082773 and WO 04/096729. A single material may act as a source of both aluminum and silicon. Examples of suitable precursor materials include various hydrated aluminum silicates such as clay as well as alumina, silica, aluminum trifluoride, various zeolites and even mullite itself. An especially preferred precursor is a mixture of clay and alumina.

The green body should contain aluminum and silicon atoms in a mole ratio of from 1 to about 4 moles of aluminum atoms per mole of silicon atoms. The theoretical composition of mullite contains aluminum and silicon in a 3:1 ratio, the empirical formula being $3Al_2O_3.2SiO_2$. However, mullite crystals can form at different aluminum to silicon ratios. As described in WO 03/082773, a preferred ratio of aluminum to silicon atoms in the green body is from 2 to 2.95, preferably to 2.9, more preferably to 2.85 and even more preferably to 2.8, as the physical strength of the mullite crystals tends to be higher in those cases, than when the aluminum to silicon mole ratio is 3.0 or more.

The green body may contain various other materials, such as sintering aids, various impurities, particularly from natural clay starting materials, or a property-enhancing compound such as is described in WO 04/096729. The property-enhancing compound is an oxide of one or more of Mg, Ca, Fe, Na, K, Ce, Pr, Nd, Sm, Eu, Gd, Tb, Dy, Ho, Er, Tm, Yb, Lu, B, Y, Sc and La, or a compound of one or more of the foregoing which forms an oxide when heated in air. If not an oxide, the property-enhancing compound may be, for example, a chloride, fluoride, nitrate, chlorate, carbonate or silicate, or a carboxylate such as acetate. More preferred compounds are those of Nd, B, Y, Ce, Fe and/or Mg. An especially preferred property-enhancing compound is a hydrated magnesium silicate such as talc. Another preferred property-enhancing compound is a mixture of a Nd, Ce, Fe and/or B compound with a Mg, Ca, Y, Pr, Sm, Eu, Gd, Tb, Dy, Ho, Er, Tm, Yb, Lu, Sc and/or La compound. If the property-enhancing compound contains silicon (such as when it is a silicate), the amount of silicon provided by the property-enhancing compound should be taken into account in calculating the aluminum-silicon ratio in the green body. The property-enhancing compound should not contain aluminum. A property-enhancing compound suitably constitutes at least 0.01, preferably at least 0.1, more preferably at least 0.5 and even more preferably at least 1 percent of the weight of the green body. It may constitute as much as 12 percent of the weight of the green body, but preferably constitutes up to 10, more preferably up to about 5 and even more preferably up to 2 percent of the weight of the green body.

The green body can be prepared using any suitable method. Wet or dry methods can be used. A binder can be mixed in with the other materials to help form the green body into the necessary shape. The starting materials can be mixed together using ball milling, ribbon blending, vertical screw mixing, V-blending, attrition milling or any other suitable technique. The mixed materials are then formed into the desired shape, using, for example, processes such as injection molding, extrusion, isostatic pressing, slip casting, roll compaction, tape casting and the like. Suitable such processes are described in *Introduction to the Principles of Ceramic Processing*, J., Reed, Chapters 20 and 21, Wiley Interscience, 1988. Binders may be burned out before the green body is converted to fluorotopaz and then to mullite.

The green body is converted to fluorotopaz by heating it in the presence of a process gas that contains a fluorine-containing compound. The fluorine-containing compound is suitably $SiF_4$, $AlF_3$, HF, $Na_2SiF_6$, NaF, $NH_4F$ or some mixture of any two or more thereof. $SiF_4$ is preferred.

It is typically preferred to heat the green body under vacuum or an inert atmosphere such as nitrogen or a noble gas until it attains a temperature of at least 500° C. Thereafter, the fluorine-containing compound is introduced into the furnace, and heating is continued until a temperature of at least 650° C., up to 800° C., is achieved.

The process gas may contain up to 100% of the fluorine-containing compound, but it is more practical to use a mixture that contains from 80 to 99%, especially from 85 to 95%, by weight of the fluorine-containing compound. The remainder of the process gas may include various gaseous products and by-products that are formed from impurities contained in the starting materials or from the fluorotopaz-forming or mullite-forming reactions.

In certain aspects of this invention, the green body is converted into fluorotopaz (step (a)) within an enclosed region of a furnace. As used, herein, a "furnace" is an enclosed heated space defined by an exterior shell. The "enclosed region" of the furnace is a sub-set of the furnace that separated from the remainder of the furnace by an enclosure. The enclosure consists of one or more walls that define the enclosed region. The enclosed region may constitute, for example, at least 20% and preferably at least 50% of the total volume of the furnace. The enclosed region may, for example, constitute up to 95% or up to 90% of the total volume of the furnace.

The enclosure that the defines the enclosed region is preferably spaced apart from the exterior shell of the furnace, so that the enclosure is spaced from the exterior shell at substantially all points about the exterior of the enclosure, so that, during the process, the process gas fills the space between the enclosure and the exterior shell of the furnace and separates the enclosure from the exterior shell. Among other advantages, this allows the interior of the enclosed region to be thermally insulated from cold spots that may exist in the portions of the furnace that are exterior to the enclosure. There may, of course, be mechanical supports to hold the enclosure in place within the furnace and typically other apparatus such as conduits for the process gas in and/or out of the enclosed region and instrumentation, which may represent direct or indirect points of contact between the enclosure and the exterior shell of the furnace. The enclosure preferably has no direct points of contact with the exterior shell of the furnace.

The enclosure is not necessarily airtight, and it is in fact preferred that there is some amount of fluid communication between the enclosed region and the rest of the furnace through the enclosure. This allows pressures inside and outside the enclosed region to be easily equilibrated, and also permits one to establish a positive flow of gas from the outside of the enclosure to the inside, as is desired in some embodiments. Therefore, the enclosure may contain pores or other openings to the exterior portion of the furnace. These pores or other openings preferably should not in the aggregate constitute no more than 10%, preferably no more than 2% of the surface area of the enclosure.

The enclosure includes means for introducing the process gas into the enclosed region. A simple system includes multiple inlet ports through which the process gas is introduced into the enclosed region, multiple outlet ports through which the process gas is removed from the enclosed region, and means for moving the process gas, i.e., means for applying a positive gas pressure at the inlet ports or a reduced gas pressure at the outlet port(s), so as to induce a flow of the process gas through the inlet ports, through the furnace enclosed region of the furnace, and then out of the outlet ports. Pumps, fans and other devices for moving the process gas are suitable. The process gas is conveniently recirculated. The process gas system in such a case includes a recirculation loop through which the process gas that is removed from the enclosed region of the furnace is recirculated to the inlet ports and re-introduced into the enclosed region. Process gas recirculated to the furnace or enclosure can be supplemented with additional gas, in particular a fluorine-containing compound or an inert diluent gas, as needed.

The inlet ports are distributed over at least one side of the enclosed region. The outlet ports are distributed over at least one other side of the enclosed region. The design and operation of the inlet and outlet ports is not particularly critical, provided that the apparatus can withstand the temperature conditions encountered during operation and that the apparatus does not react with components of the process gas.

The inlet ports may be, for example, injection jets, one or more distribution plates having multiple inlet holes, a distribution plenum or other similar devices. These devices are in fluid communication with a conduit means for supplying the process gas to the inlet ports.

The outlet ports may include a plenum, porous plate, grill or similar outlet means that has multiple openings for receiving the process gas from the enclosed region. The outlet ports may in some embodiments simply direct the process gas into the portion of the furnace exterior to the enclosed region; however, it is generally preferred to remove the process gas from the enclosed region and out of the furnace without allowing the process gas to enter the areas of the furnace exterior to the enclosed region. Therefore, the outlet ports preferably are in fluid communication with conduit means, such as a pipe, hose or other conduit, which in turn is in fluid communication with the exterior of the furnace.

Figure 1:
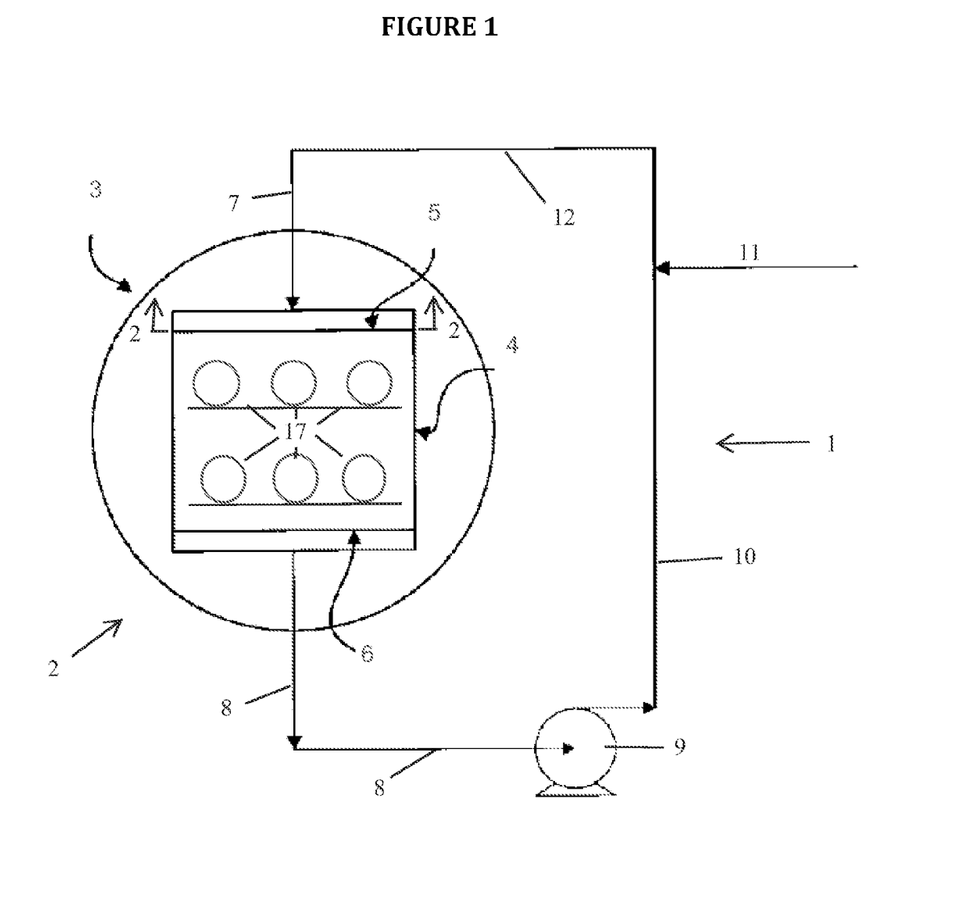
FIG. 1 is a front view, partially in section, of an embodiment of a furnace for use in this invention.

A schematic diagram of a suitable apparatus is shown in FIG. 1. Apparatus 1 includes furnace 2. In the embodiment shown, furnace 2 includes reactor shell 3, which defines the interior of furnace 2 and holds enclosure 4. Enclosure 4 defines an enclosed interior region within furnace 2 in which green bodies 17 reside during the fluorotopaz-forming step (step (a)). As shown, the walls of enclosure 4 are spaced apart from the other interior surfaces of reactor shell 3. Heating elements can be located on or around enclosure 4.

In the embodiment shown, the apparatus includes inlet plenum 5, through which process gas is introduced into the enclosed area, outlet plenum 6, through which the process gas is removed from the enclosed area, piping 7, 8, 10 and 12, and pumping means 9. Pumping means 9 is any suitable means for moving process gas through the system, i.e., means for applying a positive gas pressure at the inlet(s) and/or a reduced gas pressure at the outlet(s), so as to induce a flow of the process gas through inlet plenum 5, into and through the enclosed area, and then out of outlet plenum 6. The process gas is conveniently recirculated, as shown in FIG. 1, but it does not have to be. Fresh process gas (or components thereof, such as the fluorine-containing compound) can be supplied as necessary. In FIG. 1, this is done through line 11. The apparatus may include a filter for removing mixed metal fluoride particles that may precipitate in the process gas, or other solid or condensed materials.

Figure 2:
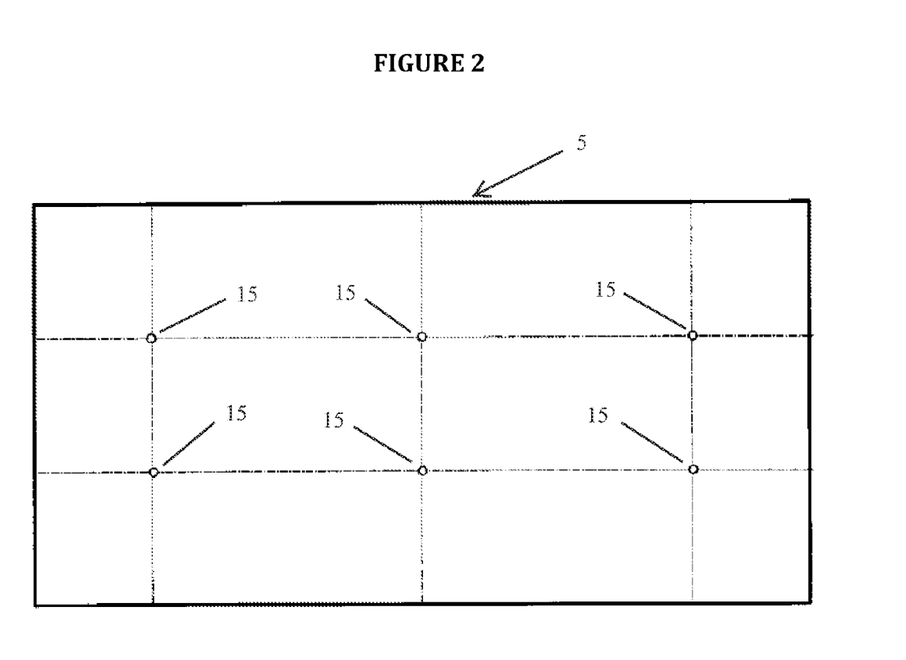
FIG. 2 is a bottom view taken along lines 2-2 of FIG. 1, of an inlet plenum for use with the process of the invention.

The interior surface of inlet plenum 5 may be a distribution plate that contains a plurality of inlet holes through which the process gas is introduced into the enclosed region of the furnace. FIG. 2 illustrates one of many possible hole configurations for inlet plenum 5. The view is of the interior surface of inlet plenum 5, i.e., a distribution plate facing the interior of the space enclosed by enclosure 4. Inlet holes 15 are distributed across the surface of inlet plenum 5. During operation, the process gas enters enclosure 4 through inlet holes 15, passes through the enclosed region, and exits though outlet plenum 6, which also has one or more outlet holes. The pattern, spacing and number of holes in each of inlet plenum 5 and outlet plenum 6 will of course depend on many factors, such as the geometry of the furnace or enclosed area (as the case may be), the location and size of the green body or bodies, needed flow rates, and the like. Preferably, the hole location and spacing is such that a flow is established during operation in essentially all areas of the region enclosed by enclosure 4.

During step (a) a flow of the process gas is established through the enclosed region, but it is not necessary to establish such a flow through the portions of the furnace exterior to the enclosed region. However, process gas removed from the enclosed area may flow through those exterior portions of the furnace if desired.

In the simplest case, the flow rate of the process gas through the enclosed region of the furnace only needs to be sufficient to replenish the fluorine-containing compound from areas localized within the enclosed region, from which the fluorine-containing compound becomes depleted as fluorotopaz forms. Therefore, in general the flow rate through the enclosed region during step (a) can vary considerably, such as from 0.25 to 2, preferably from 0.5 to 1 times the volume of the furnace (or enclosed area within the furnace, if used) per minute. The flow rate can be adjusted together with the concentration of the fluorine-containing compound within the process gas, to simultaneously perform a replenishing function and establish a desired partial pressure of the fluorine-containing components at any given time during the course of the fluorotopaz-forming reaction.

Although the invention is not limited to any theory, it is believed that part-to-part variations that sometimes occur when multiple green bodies are simultaneously processed sometimes result from localized "dead zones" in the furnace in which the concentration of fluorine-containing compound is reduced or depleted during step (a) of the process. It is believed that the fluorotopaz-forming reaction proceeds more slowly in these regions than in other regions in which the local concentration of fluorine-containing compound is higher. The use of an enclosed region, and the flow of the process gas through the enclosed region during step (a), is believed to promote more uniform reaction rates between individual bodies, and in some cases even within a single body, by replenishing the fluorine-containing compound to the areas within the enclosed region from which it has become depleted.

In certain aspects of the invention, the manner in which the process gas is introduced during the fluorotopaz-forming step (step (a)) can function as a means for controlling the exotherm that is produced as fluorotopaz forms. In those embodiments, the partial pressure of the fluorine-containing compound in the furnace (or enclosed region) throughout the reaction can be adjusted or maintained to a desired level. This in turn allows for some control over the reaction rate and the exotherm, which, in turn allows for control over the temperature of the green body or bodies during the fluorotopaz-forming step. Adjustments to the partial pressure of the fluorine-containing compound can be made by controlling the rate at which the process gas is introduced into the enclosed region, by controlling the concentration of the fluorine-containing compound in the process gas, or through some combination of both. Generally, the partial pressure of the fluorine-containing gas inside the enclosed region is adjusted during the fluorotopaz-forming reaction such that the temperature of the body or bodies is maintained within a predetermined temperature range. The predetermined temperature range is typically at least 650° C. but preferably not greater than 800° C. during the fluorotopaz-forming reaction. It is preferred to maintain the temperature of the body or bodies within the range of 725 to 780°, and even more preferred to maintain that temperature between 740 and 770° C. Note that, due to localized exotherms and efficiencies of heat removal, the temperature of the body or bodies (or even localized sections of such body or bodies) may exceed that of the atmosphere and/or interior surfaces of the enclosed region of the furnace.

Generally, a higher partial pressure of the fluorine-containing compound promotes a higher reaction rate, which creates a greater amount of exothermic heat and drives the temperature of the bodies upward. Therefore, reducing the rate of addition of the fluorine-containing compound and/or the concentration of the fluorine-containing compound in the process gas can have the opposite effect.

Therefore, in some embodiments of the invention, the temperature of the body or bodies is monitored, and when the temperature reaches a predetermined value, the rate of addition of the process gas and/or the concentration of the fluorine-containing compound in the process gas can be adjusted downwardly (in the case of a predetermined maximum temperature being reached) or upwardly (in the case of a predetermined minimum temperature being reached).

It is preferred to monitor the temperature of one or more core portions of the body or bodies. The core portions of the body or bodies tend to reach the highest temperatures due to the exothermic reaction, because it is most difficult to remove heat from the core of the body or bodies.

In other embodiments, it is possible to eliminate the direct temperature measurement, yet still use the rate of addition of the process gas and/or the concentration of the fluoride-containing compound in the process gas to maintain the temperature of the body or bodies within the desired temperature range, such as at least 650° C. but not greater than 800° C. Process gas addition profiles, including addition rate, concentration of the fluorine-containing gas, or both, can be established empirically for a given set of reaction conditions, in particular part mass and geometry, the number of parts, and the furnace geometry, which will result in the temperature being maintained within the desired temperature range. This process gas addition profile can then be used each time that set of reaction conditions is reproduced, to maintain the temperature of the body or bodies within the desired range. It becomes unnecessary in such a case to continue to monitor part temperatures directly.

In many cases, a beneficial process gas addition profile during step (a) of the process is one in which the rate at which the process gas and/or concentration of the fluorine-containing compound in the process gas is added is decreased one or more times during the course of the fluorotopaz-forming reaction. The decrease can be done incrementally in one or more steps or continuously. Such a profile helps to promote short cycle times, as the partial pressure of the fluorine-containing compound often can be relatively high in early stages of the reaction, while preserving the ability to control the exotherm and in that manner the quality of the parts. Actual process gas addition profiles will of course vary according to several factors, and in most cases will be established empirically for a given set of conditions, including the number, size and geometry of the parts, the geometry of the furnace, and the desired temperatures. In some instances, a suitable addition rate in the early stages of the reaction (until about 40% conversion to fluorotopaz) is from about 0.3 to 1.0, preferably from 0.3 to 0.6, standard liters/minute per kilogram of green body, for a process gas containing 85-95% by weight of the fluorine-containing compound. A suitable addition rate during the last stages of the reaction (from about 75 to 100% conversion to fluorotopaz) may in such a case be from about 0.03 to 0.15, preferably from 0.05 to 0.12 standard liters/minute/kg of green body. The addition rate at the end of the reaction in certain embodiments may be about 10 to 30% of the initial addition rate. The addition rate may be reduced continuously from the higher to the lower values, or in a single increment, or in multiple increments. An example of how the addition rate of a process gas containing 85-95% by weight of $SiF_4$ can be incrementally reduced is as follows:

| Starting % Conversion to Fluorotopaz | Ending % Conversion to Fluorotopaz | Average addition rate, standard liters/minute/kg of green body |
|---|---|---|
| 0 | 40 | 0.3-1.0, preferably 0.3-0.6 |
| 40 | 60 | 0.2-0.6, preferably 0.2-0.4 |
| 60 | 80 | 0.1-0.4, preferably 0.1-0.25 |
| 80 | 100 | 0.03-0.15, preferably 0.05-0.12 |

Once the green body or bodies have been converted to fluorotopaz, the temperature is increased to above 800° C. to decompose the fluorotopaz and produce mullite needles. The temperature during this step is preferably at least 1000° C., and may be as high as 1700° C. A more preferred temperature is at least 1050° C., or at least 1100° C. The preferred temperature may be up to 1500° C. and a more preferred temperature is up to 1200° C.

The needle-forming step is generally performed in a non-oxidizing atmosphere. The fluorine-containing compound may be present in the process gas during this step, but the partial pressure thereof is advantageously not greater than 500 torr, and more preferably is not greater than 350 torr.

As the fluorotopaz decomposes to form mullite, a mass of interconnected needle-like crystallites is created. The needles are comprised mainly of a crystalline mullite, although it is possible for small quantities of other crystalline and/or glassy phases to be present. For example, the product may contain up to about 2 volume percent of a crystalline silica phase such as cristobalite, as described in WO 03/082773, or up to about 1 volume percent of a glassy oxide phase that may contain silicon and/or aluminum as well as one or more metals contributed by a sintering aid and/or the property-enhancing compound described before.

The needles are bonded together at points of contact to form a porous mass having essentially the same geometry and dimensions (other than the presence of pores) as the green body. The aspect ratio of the mullite needles is typically at least 5, preferably at least 10, more preferably at least 20 and often at least 40. The needles may have a mean diameter of from 5 to 250 microns.

The porous body may have a porosity of at least 40 percent, preferably at least 50 percent, more preferably at least 55 percent, to as much as 85 percent, preferably to as much as 80 percent and more preferably to as much as 70 percent. The porous body may have a permeability coefficient of at least $1 \times 10^{-13}$ m$^2$, preferably at least $2 \times 10^{-13}$ m$^2$, as determined using Darcy's equation.

The certain aspects of the invention, the bodies are contained within an enclosed region of the furnace as described before, and a purge gas flows through areas of the furnace exterior to the enclosed region during the fluorotopaz-decomposition step (step (b)). This purge gas flow helps to reduce reactor fouling by providing a net flow of clean gas (no mixed metal fluorides) through the portions of the furnace that are exterior to the enclosed region. This net flow of gas minimizes the amount of vapor phase mixed metal fluorides that can condense on cooler surfaces and cause fouling.

Therefore, the reactor for use in such embodiments includes an enclosure as described before and apparatus for providing such a flow of process gas through the exterior portions of the furnace. The design and operation of such apparatus is not particularly critical, provided that the apparatus can withstand the temperature conditions encountered during operation and that the apparatus does not react with components of the atmosphere. In a simple case, the apparatus includes one or more inlets through which the purge gas is introduced into the portion of the furnace exterior to the enclosed area, an outlet through which the purge gas is removed from the furnace, and means for moving the process gas through the furnace, i.e. means for applying a positive gas pressure at the inlet(s) or a reduced gas pressure at the outlet(s), so as to induce a flow of the gas through the inlet(s) and the exterior portions of the furnace, and then out of the outlet(s). The purge gas is conveniently recirculated. The purge gas system in such a case includes a recirculation loop through which the purge gas that is removed from the furnace is recirculated to the inlet and re-introduced. Such a recirculation loop includes a filter for removing mixed metal fluoride particles that may precipitate in the purge gas.

In especially preferred embodiments, during step (b), the purge gas flows into the exterior portions of the furnace and then into the enclosed interior region, where it then functions as the process gas during the fluorotopaz decomposition step. The purge gas then is removed from the enclosed region of the furnace and from the furnace as a whole without re-entering the exterior portion of the furnace. In such a case, the composition of the purge gas is the same as described before with respect to the process gases used in step (b) of the process. In such embodiments, the enclosure contains one or more inlets through which gas can pass from the exterior portions of the furnace to the enclosed interior region, and at least one outlet through which the gas can then be removed from the enclosed region and out of the furnace.

The inlets into the enclosed region of the furnace may be, for example, pores or other openings in the enclosure.

Figure 3:
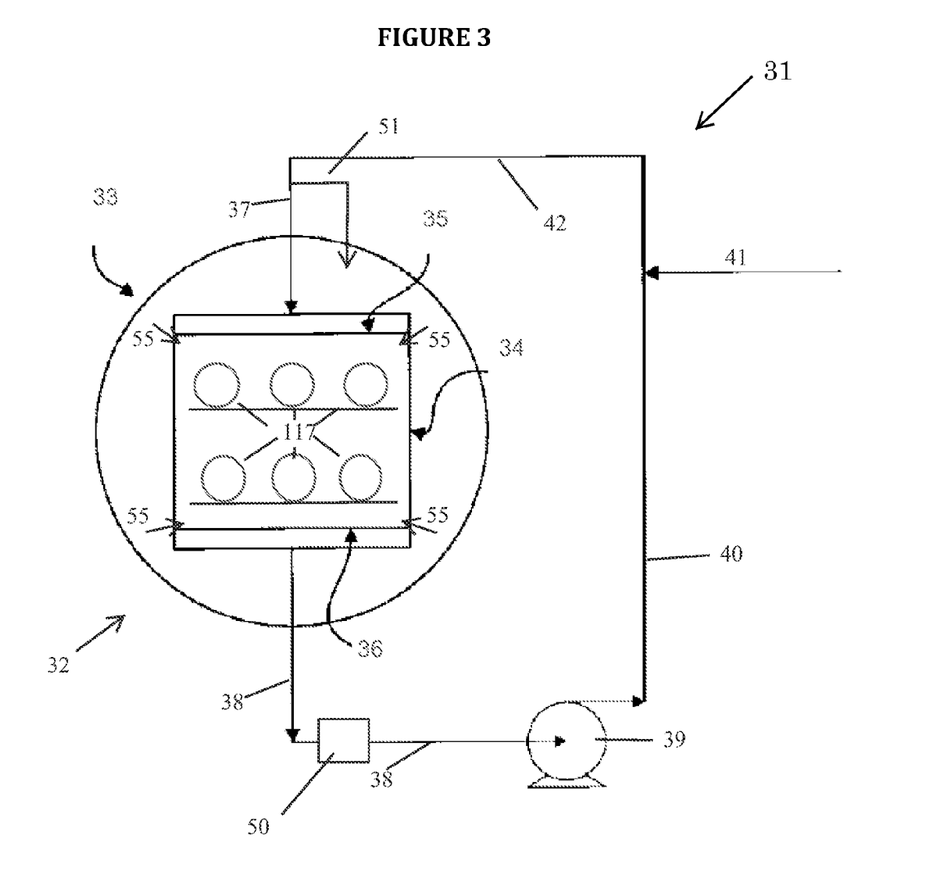
FIG. 3 is a front view, partially in section, of a second embodiment of a furnace for use in this invention.

A schematic diagram of an embodiment of a preferred apparatus for performing step (b) of the process is shown in FIG. 3. Apparatus 31 includes furnace 32. Furnace 32 includes reactor shell 33 and enclosure 34. As before, enclosure 34 defines an enclosed interior region in which bodies 117 reside during the fluorotopaz-decomposition step. Enclosure 34 greatly reduces or prevents mixed metal fluoride vapors from escaping from the enclosed interior region and into the exterior portions of furnace 32 during step (b) of the process, where they may encounter cooler temperatures and precipitate to foul reactor surfaces. As before, the walls of enclosure 34 are preferably spaced apart from the other interior surfaces of furnace 32, so that the interior of the enclosed space is thermally insulated from cold spots that may exist in furnace exterior to the enclosed region.

In the embodiment shown in FIG. 3, a purge gas is delivered into the exterior portions of furnace 32 though inlet pipe 51. As shown, inlet pipe 51 draws a side stream from pipe 37, through which process gasses are also supplied into the enclosed region defined by enclosure 34. In such an embodiment, the purge gas has the same composition as the process gas supplied into the enclosed region. It is also possible to supply the purge gas as a separate stream, through a separate supply system, in which case the purge gas may or may not have the same composition as the process gas that enters the enclosed region defined by enclosure 34.

In the embodiment shown in FIG. 3, enclosure 34 includes means for introducing a flow of process gas through the enclosed region. As shown, this means includes inlet plenum 35, through which the process gas is introduced into the enclosed area, outlet plenum 36, through which the process gas is removed from the enclosed area, piping 37, 38, 40 and 42, and pumping means 39. As shown, piping 37, 38, 40 and 42 together with pumping means 39 define an optional recirculation loop through which the process gas is recirculated. As shown, optional line 11 supplies fresh fluorine-containing compound as necessary. As shown, the apparatus includes filter 50 for removing mixed metal fluoride particles that may precipitate in the outlet gas, or other solid or condensed materials.

In the embodiment shown in FIG. 3, the walls of enclosure 34 have pores or other openings through which there is provided some amount of fluid communication between the enclosed region and the rest of furnace 32. This allows the purge gas entering the exterior portion of furnace 32 to be removed by flowing the purge gas through enclosure 34 and into the enclosed area defined by enclosure 34. The direction of this flow is indicated by arrows 55. Once the purge gas enters the enclosed region, it mixes with the remainder of the process gases supplied to the enclosed region through plenum 35. The combined gases are then removed from the furnace through outlet plenum 36 and line 38. As shown, the gases removed from the enclosed region are not permitted to re-enter the exterior portion of the furnace.

The interior walls of enclosure 34 and the enclosed region preferably are maintained at a temperature of at least 1000° C. during the fluorotopaz-decomposition step to form mullite needles. As a result, there is little or no precipitation of mixed metal fluorides inside the enclosure. This keeps mixed metal fluorides mainly in the vapor phase, and in that way the equilibrium between these gas phase species and the mullite bodies can be more easily maintained.

In an alternative embodiment, no separate gas flow is introduced into the enclosed area. Instead, the process gas is introduced into the exterior regions of the furnace, and then passes into the enclosure through one or more, preferably multiple inlets. The process gases then flow through the enclosed region of the furnace before they are removed. This eliminates the need to introduce multiple feeds of processes gasses into the furnace.

The following examples are provided to illustrate the invention but are not intended to limit the scope thereof. All parts and percentages are by weight unless otherwise indicated. Unless stated otherwise, all molecular weights expressed herein are weight average molecular weight.

EXAMPLE 1 AND COMPARATIVE RUN A

These runs illustrate the benefits of recirculating process gases during the fluorotopaz-forming reaction.

Comparative Run A is performed in a water-jacketed vacuum furnace, essentially as described in FIG. 1. A graphite box forms an enclosure that defines a 305 mm×305 mm×610 mm enclosed region of the furnace. The volume of the enclosed region is approximately 57 liters. Heating elements are arranged around the sides of enclosure 32. Two green bodies, (each a honeycomb 5.66 inches in diameter and 6 inches in length with a mass of about 1.28 kg) are introduced into the furnace. The furnace is heated to 700° C. under vacuum, and then a process gas containing 85-95% $SiF_4$ is introduced. Process gas is provided to the box through a single inlet at the top of the box during the fluorotopaz-forming step (step (a)). $SiF_4$ is supplied at a partial pressure of 50 mm Hg during the course of the reaction. Temperature probes in the core of each green body measure temperature over the course of the reaction.

Example 1 is run in the same apparatus and in the same manner, except the box contains an inlet plenum and an outlet plenum, and eight green bodies are present. The inlet plenum has six 3.18 mm holes, arranged in the pattern shown in FIG. 2. The outlet plenum also contains 6 spaced 3.18 mm holes. The process gas is circulated at the rate of from 30 to 60 liters per minute, i.e., about 0.5 to 1 times the volume of the enclosed region per minute.

On Comparative Run A, one of the two instrumented parts undergoes an exothermic reaction to form fluorotopaz, beginning with 30 minutes after the time the furnace reaches the set temperature, and finishing after about 410 minutes. However, the second part reacts much more slowly, and the exothermic reaction is not completed until after about 650 minutes.

In Example 1, each of the instrumented parts reacts simultaneously, and the exothermic reaction for each of these parts is completed within about 500 minutes. By establishing a flow of the process gases through the reactor, the cycle time to form fluorotopaz is reduced by about 2.5 hours (about 23%).

EXAMPLE 2

In this run, the exotherm in the fluorotopaz-forming reaction is controlled by controlling the rate of addition of the process gases.

Example 2 is run in the same general manner as Example 1, except the enclosed area of the furnace contains 8 green bodies, each in the form of a honeycomb 5.66 inches in diameter and 6 inches in length with a mass of about 1.28 kg. Once the furnace reaches the set temperature, a process gas containing 85-95% $SiF_4$ is fed into the furnace at a rate of about 0.447 standard liters/minute per kilogram of green body. This establishes an SiF$_4$ partial pressure inside the furnace of approximately 50 mm Hg. Temperature sensors in the green bodies indicate that an exothermic reaction begins about 40 minutes after the process gas flow has started. After about 75-90 minutes, the parts have developed a core temperature of 750-755° C. At this point, it is estimated that the conversion to fluorotopaz is about 40%.

In order to prevent a further temperature rise in the parts, the process gas flow rate is reduced after about 100 minutes to a rate of 0.302 standard liters/minute/kg of green body. This has the effect of preventing a further increase in the temperatures of the parts, which remains at about 750-755° C. After about 160 minutes, the conversion to fluorotopaz is about 61%. At this time, the process gas flow rate is again reduced, this time to a rate of 0.205 standard liters/minute/kg of green body. The part temperature is still maintained at about 750-755° C. After about 280 minutes (all times being calculated from the start of process gas addition), the conversion to fluorotopaz is about 79%. At this point, the process gas flow rate is once again reduced, this time to 0.096 standard liters/minute/kg of green body. Soon thereafter, the part temperatures begin to drop due to the reduction in available SiF$_4$ and the completion of the fluorotopaz-forming reaction. Approximately 100% conversion to fluorotopaz is achieved in about 6 hours.

This run establishes a protocol for adding process gases that, for these particular conditions, allows the part temperature to be controlled to 750-755° C. throughout the reaction. This protocol can be used in subsequent reactions under the same conditions, without the need to monitor process temperatures.

EXAMPLE 3 AND COMPARATIVE
EXPERIMENT B

Example 3 is performed using an apparatus as described in FIG. 3, except that, instead of using inlet and outlet plenums as shown in FIG. 3, the process gas is introduced into the enclosed area of the furnace through a single inlet located at the top of the enclosure, and the process gas is removed from the enclosed area of the furnace through a single outlet located on a side of the enclosure. Conditions for performing the fluorotopaz-forming reaction are generally as described for Comparative Run A or Example 1. The fluorotopaz is decomposed at about 1100-1200° C. in the presence of an atmosphere containing SiF$_4$.

In Example 3, a purge gas is introduced into the exterior regions of the furnace during the reaction. The pressure outside of the enclosure is slightly greater than that inside the enclosure. The enclosure is has small openings which allow the purge gas to flow into the enclosure, from which it is removed from the system without re-entering the exterior portion of the furnace. After the reaction is completed, the amount of mixed metal fluorides that have deposited on the reactor surfaces is measured. During several repeat runs, this amount is found to range from 0.7 to 1.0 grams/kg of green body.

In Comparative Experiment B, no purge gas is introduced into the exterior regions of the furnace. In several runs, the amount of mixed metal fluorides that have deposited on the reactor surfaces ranges from 4.8 to 12.6 grams/kg green body.

From these experiments, it is seen the introduction of the purge gas results in a dramatic decrease in reactor wall fouling.

What is claimed is:

1. A process for producing an acicular mullite body or bodies, comprising:
   (a) heating at least one green body to a temperature of 650° C. to 800° C. in an enclosed region of a furnace, in the presence of a process gas containing a fluorine-containing compound flowing through the enclosed region of the furnace, such that a source of aluminum and a source of silicon in the green body react with the fluorine-containing compound to form fluorotopaz, wherein the furnace has a volume of the furnace defined by an exterior shell and the enclosed region of the furnace is defined by an enclosure, wherein the enclosure is spaced from the exterior shell and the enclosed region of the furnace constitutes 20 to 95% of the volume of the furnace; and then
   (b) heating the body to a temperature above 800° C. such that the fluorotopaz decomposes to form a porous acicular mullite body,
   wherein, in step (a), the process gas is introduced into the enclosed region through multiple inlets distributed over at least one side of the enclosed region and the process gas is withdrawn from the enclosed region through multiple outlets distributed over at least one other side of the enclosed region to establish a flow rate of the process gas through the enclosed region from 0.25 to 2 times the volume of the enclosed area of the furnace per minute.

2. The process of claim 1, wherein the enclosed region of the furnace is in fluid communication with the portion of the furnace exterior to the enclosure through one or more openings in the enclosure.

3. The process of claim 2, wherein the opening(s) in the enclosure in the aggregate constitute no more than 2% of the surface area of the enclosure.

4. The process of claim 1 wherein in step (a), the flow rate of the process gas, the content of the fluorine-containing compound in the process gas, or both are decreased at least once during the course of step (a).

5. The process of claim 1 wherein in step (a), the temperature of the body or bodies is monitored, and the partial pressure of the fluorine-containing compound in the enclosed region of the furnace is reduced if the temperature of the body or bodies reaches or exceeds a predetermined temperature.

6. The process of claim 1, wherein in step (a) the temperature of the body or bodies is monitored, the rate of addition of the process gas is reduced if the temperature of the body or bodies reaches or exceeds a predetermined temperature.

7. The process of claim 1 wherein in step (a) the partial pressure of the fluorine-containing compound in the furnace or enclosed region of the furnace is controlled such that the temperature of the body or bodies is maintained at a temperature of at least 650° C. but not greater than 800° C.

8. The process of claim 7, wherein the partial pressure of the fluorine-containing compound is controlled by an adjustment of the flow rate of the process gas, an adjustment of the content of the fluorine-containing compound in the process gas, or both.

* * * * *